United States Patent
Wang et al.

(10) Patent No.: US 9,537,829 B2
(45) Date of Patent: *Jan. 3, 2017

(54) METHODS AND APPARATUS TO IMPROVE SECURITY OF A VIRTUAL PRIVATE MOBILE NETWORK

(71) Applicant: AT&T Intellectual Property I, L.P., Atlanta, GA (US)

(72) Inventors: Wei Wang, New York, NY (US); Charles Shen, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/921,881

(22) Filed: Oct. 23, 2015

(65) Prior Publication Data

US 2016/0043998 A1    Feb. 11, 2016

Related U.S. Application Data

(63) Continuation of application No. 13/170,845, filed on Jun. 28, 2011, now Pat. No. 9,172,678.

(51) Int. Cl.
*H04L 29/06* (2006.01)
*H04W 12/08* (2009.01)

(52) U.S. Cl.
CPC ....... *H04L 63/0272* (2013.01); *H04L 63/0209* (2013.01); *H04L 63/04* (2013.01); *H04W 12/08* (2013.01)

(58) Field of Classification Search
CPC ............. H04L 63/1408; H04L 63/1433; H04L 63/145; H04L 65/1069; H04L 63/1458; H04L 63/1466; H04L 63/0272; H04L 63/1475; H04L 9/005; H04L 9/0662; H04W 12/08; H04W 12/12; H04W 84/18; H04W 8/22; H04W 8/26; H04W 12/02; H04W 24/00; H04W 48/02; H04W 4/14; H04W 72/042; H04W 24/10; H04W 28/0231; H04W 28/0252; H04W 48/08; H04W 72/0446; H04W 72/085; H04W 72/12; H04W 84/045; H04W 84/12; H04W 88/08; H04W 12/04; H04W 16/10; H04W 16/14; H04W 16/16; H04W 24/08; H04W 28/02; H04W 28/06; H04W 28/26; H04W 40/00; H04W 40/244; H04W 4/00; H04W 4/005; H04W 52/34; H04W 52/46; H04W 52/48; H04W 56/0015; H04W 56/002; H04W 60/00; H04W 72/00; H04W 72/04; H04W 72/0433; H04W 72/1205; H04W 72/1215; H04W 72/1289; H04W 80/00

See application file for complete search history.

(56) References Cited

U.S. PATENT DOCUMENTS 6,438,367 B1    8/2002    Crawford
6,701,437 B1    3/2004    Hoke et al.
(Continued)

OTHER PUBLICATIONS

Bhanage et al., "Virtual Basestation: Architecture for an Open Shared WiMAX Framework," SIGCOMM ACM Special Interest Group on Data Communication, Sep. 2010, 8 pages.
(Continued)

*Primary Examiner* — Greg C Bengzon
(74) *Attorney, Agent, or Firm* — Hanley, Flight & Zimmerman, LLC

(57) ABSTRACT

Methods and apparatus are disclosed to prevent consecutive attacks on a virtual private mobile network. An example method includes for each of a plurality of network elements, generating virtualized slices based on a virtualized slice
(Continued)

count value for subgroups associated with the virtual private mobile network, and assigning non-consecutive ones of the virtualized slices to the subgroups associated with the virtual private mobile network based on demand for the virtualized slices by the respective ones of the subgroups. The example method also includes, in response to a request from a mobile device to access the virtual private mobile network for a first time, assigning the mobile device to one of the virtual slices of the plurality of network elements based on (i) the subgroup associated with the mobile device, and (ii) availability of the virtual slices.

15 Claims, 7 Drawing Sheets

(56) References Cited

U.S. PATENT DOCUMENTS

| | | | |
|---|---|---|---|
| 6,738,910 | B1 | 5/2004 | Genty et al. |
| 6,981,157 | B2 | 12/2005 | Jakobsson et al. |
| 7,155,518 | B2 | 12/2006 | Forslöw |
| 7,243,148 | B2 | 7/2007 | Keir et al. |
| 7,246,232 | B2 | 7/2007 | Dutertre |
| 7,373,150 | B2 | 5/2008 | Cho et al. |
| 7,486,735 | B2 | 2/2009 | Dubuc et al. |
| 7,536,691 | B2 | 5/2009 | Kavoori et al. |
| 7,558,877 | B1 | 7/2009 | Fedyk et al. |
| 7,640,338 | B2 | 12/2009 | Huitema et al. |
| 7,756,042 | B2 | 7/2010 | Guo et al. |
| 7,783,756 | B2 | 8/2010 | Choyi et al. |
| 7,792,935 | B2 | 9/2010 | Karjanlahti |
| 7,870,604 | B1 | 1/2011 | Guichard et al. |
| 7,882,247 | B2 | 2/2011 | Sturniolo et al. |
| 7,929,407 | B2 | 4/2011 | Ma et al. |
| 7,995,994 | B2 | 8/2011 | Khetawat et al. |
| 8,072,920 | B2 | 12/2011 | Heo et al. |
| 8,073,428 | B2 | 12/2011 | Khetawat et al. |
| 8,089,993 | B2 | 1/2012 | Wei et al. |
| 8,095,138 | B2 | 1/2012 | Matsumoto et al. |
| RE43,277 | E | 3/2012 | Jung et al. |
| 8,316,428 | B2 | 11/2012 | Kozat et al. |
| 8,351,948 | B2 | 1/2013 | Kokku et al. |
| 8,478,891 | B1 | 7/2013 | Breau et al. |
| 9,172,678 | B2 | 10/2015 | Wang et al. |
| 2003/0050070 | A1* | 3/2003 | Mashinsky ............ H04M 15/00 455/452.1 |
| 2004/0177157 | A1 | 9/2004 | Mistry et al. |
| 2005/0193103 | A1 | 9/2005 | Drabik |
| 2005/0216590 | A1 | 9/2005 | Aubin et al. |
| 2007/0287417 | A1 | 12/2007 | Abramovich |
| 2008/0052779 | A1 | 2/2008 | Sinha et al. |
| 2008/0244743 | A1 | 10/2008 | Largman et al. |
| 2009/0205046 | A1 | 8/2009 | Radosavac et al. |
| 2010/0057485 | A1 | 3/2010 | Luft |
| 2010/0091641 | A1 | 4/2010 | Gaal et al. |
| 2010/0281251 | A1 | 11/2010 | Arauz Rosado |
| 2011/0026392 | A1 | 2/2011 | Wen et al. |
| 2011/0035796 | A1 | 2/2011 | Khalid et al. |
| 2011/0134861 | A1 | 6/2011 | Seo et al. |
| 2011/0154101 | A1 | 6/2011 | Merwe et al. |
| 2011/0164492 | A1 | 7/2011 | Ma et al. |
| 2011/0194551 | A1 | 8/2011 | Lee et al. |
| 2011/0200129 | A1 | 8/2011 | Hwang et al. |
| 2011/0249644 | A1 | 10/2011 | Boariu et al. |
| 2011/0250900 | A1 | 10/2011 | Kokku et al. |
| 2011/0271112 | A1 | 11/2011 | Bajko et al. |
| 2012/0002620 | A1* | 1/2012 | Kokku ................ H04L 47/2441 370/329 |
| 2012/0051296 | A1* | 3/2012 | Kokku ................. H04W 28/26 370/329 |
| 2012/0060029 | A1 | 3/2012 | Fluhrer et al. |
| 2012/0131653 | A1 | 5/2012 | Pasquero et al. |
| 2012/0176982 | A1* | 7/2012 | Zirwas .................. H04B 7/024 370/329 |
| 2012/0216242 | A1 | 8/2012 | Uner et al. |
| 2012/0224691 | A1 | 9/2012 | Purohit |
| 2012/0233302 | A1 | 9/2012 | Kallin et al. |
| 2012/0270523 | A1 | 10/2012 | Laudermilch et al. |
| 2013/0029641 | A1 | 1/2013 | Hickie |
| 2013/0064197 | A1 | 3/2013 | Novak et al. |
| 2013/0080645 | A1 | 3/2013 | Paul et al. |
| 2013/0084830 | A1 | 4/2013 | Paul et al. |
| 2014/0254545 | A1 | 9/2014 | Novak et al. |

OTHER PUBLICATIONS

Fernandes et al., "Virtual Networks: Isolation, Performance, and Trends," vol. 66, Issue 5-6, Annals of Telecommunications, Jun. 2011, 23 pages.
Heiser, "VMware's MVP-Encryption Doesn't Make it Secure!" Open Kernel Labs Blog, www.ok-labs.com, Oct. 22, 2010, 2 pages.
Gaurav et al., "Countering Code-Injection Attacks When Instruction-Set Randomization," copyright 2003, 9 pages.
United States Patent and Trademark Office, "Non-Final Office Action," issued in connection with U.S. Appl. No. 13/170,845, Jun. 28, 2013, 29 pages.
United States Patent and Trademark Office, "Final Office Action," issued in connection with U.S Appl. No. 13/170,845, Nov. 21, 2013, 35 pages.
United States Patent and Trademark Office, "Non-Final Office Action," issued in connection with U.S. Appl. No. 13/170,845, Nov. 3, 2014, 28 pages.
United States Patent and Trademark Office, "Notice of Allowance," issued in connection with U.S. Appl. No. 13/170,845, Jun. 24, 2015, 42 pages.

* cited by examiner

METHODS AND APPARATUS TO IMPROVE SECURITY OF A VIRTUAL PRIVATE MOBILE NETWORK

RELATED APPLICATIONS

This patent arises as a continuation of U.S. patent application Ser. No. 13/170,845, filed Jun. 28, 2011, issued as U.S. Pat. No. 9,172,678 on Oct. 27, 2015, which is incorporated herein by reference in its entirety.

FIELD OF THE DISCLOSURE

This disclosure relates generally to mobile communication security, and, more particularly, to methods and apparatus to improve security of a virtual private mobile network.

BACKGROUND

In recent years, mobile network service providers have developed, expanded and maintained a mobile network infrastructure to support a rapidly growing customer base. Wireless telephones that depend on the mobile network infrastructure may communicate more than voice traffic. For example, virtual devices may communicate video, data, text and/or electronic mail (e-mail) messages. Such an expanded suite of wireless telephone functionality provides users with an opportunity to manage work e-mail, work data servers and/or other work related services, personal e-mail and/or personal finance services (e.g., web-based banking) on the same or multiple mobile devices.

The robust functionality of recently commercialized wireless telephones (e.g., smart phones such as the iPhone and/or Android), when supported by appropriate mobile network infrastructure, facilitates legitimate access to work related information, legitimate access to personal information and/or legitimate access to financial access information. However, the robust functionality of the wireless telephone also introduces a degree of risk to such work related information, personal information and/or financial information in the event that the mobile network infrastructure is compromised.

DETAILED DESCRIPTION

Figure 1:
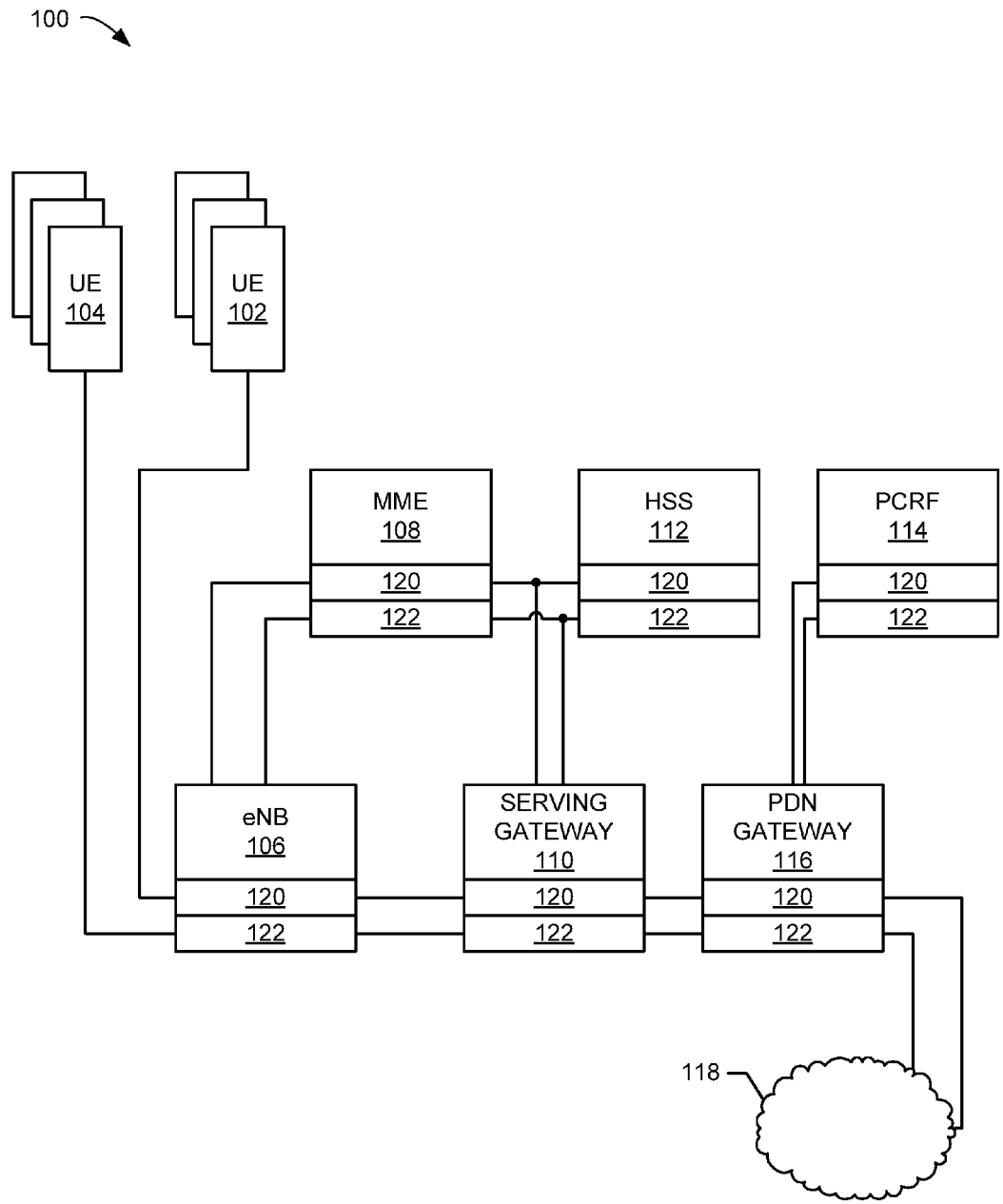
FIG. 1 is a schematic illustration of an example mobile network that facilitates a virtual private mobile network.

Methods, apparatus, and articles of manufacture are disclosed, which improve security of a virtual private mobile network. An example method includes identifying a request to initialize the virtual private mobile network, identify a number of subgroups to associate with the virtual private mobile network, generating a virtualized slice count value based on the number of subgroups, and initializing network elements with a number of virtualized slices based on the virtualized slice count value.

Virtual Private Mobile Networks (VPMNs) provide isolated mobile network services to one or more different user groups by, in part, dividing network resources into one or more virtualized instances. For example, in the event a VPMN is implemented to support two separate groups of users, such as government employees/users and non-government employees/users, then the VPMN may be configured to facilitate two separate virtual instances for each network resource. Network resources that support virtualization may include, but are not limited to, mobility management entities (MMEs), home subscriber servers (HSSs), evolved node Bs (eNBs), serving gateways, public data network (PDN) gateways and/or policy and charging rules function (PCRF) nodes. In operation, such a VPMN provides isolation between the example government and non-government users and establishes a virtual tunnel in which traffic will share network resources without providing access to the data of the first group to the second and vice-versa. In other words, the government users and the non-government users may use different virtual tunnels that are logically separate from the other.

At least one benefit of establishing a first VPMN (e.g., a first virtualized instance) for the example government workers and a second VPMN (e.g., a second virtualized instance) for the example non-government workers is that, in the event one of the VPMNs is compromised (e.g., by hackers), the other (e.g., non-hacked) VPMN will be unaffected. The virtualized instances are managed by, for example, a virtualization manager to time-slice (e.g., allocate) underlying hardware resources for each VPMN. As such, while the VPMN associated with the government workers is under attack (e.g., a denial of service (DoS attack) such that a given attacked resource is inundated with excessive traffic), the designated time-slice of that network resource allocated to the non-government users by the virtualization manager is not inundated by the DoS attack.

While separation of network resources via one or more virtualization techniques allows corresponding separation of differing groups of users that share the underlying network components, each established VPMN operates as a single point of failure for the whole group that may be sharing one virtualized instance. In other words, in the event a single government user account and/or user equipment (e.g., wireless telephone, mobile device) is compromised, then all members of the VPMN associated with that government user account are at risk and suffer the negative effects of the attack (e.g., decreased network responsivity due to the DoS attack(s)). Methods, apparatus, systems and/or articles of manufacture disclosed herein overcome such problems by providing isolation within an example group of users of a same VPMN that may be sharing the hardware resources of the network components that facilitate wireless services, thereby improving the security of the VPMN instance(s).

FIG. 1 is a schematic illustration of an example mobile network 100 that facilitates two VPMNs. The example mobile network of FIG. 1 includes a first group of user equipment (UE) 102, a second group of UE 104, an eNB 106, an MME 108, a serving gateway 110, an HSS 112, a PCRF node 114 and a PDN gateway 116 communicatively connected to a network 118, such as the Internet. The example first group of UE 102 may represent users (e.g., users having wireless telephones, mobile communication devices, etc.) associated with a government entity, and the second group of UE 104 may represent users (e.g., users having wireless telephones, mobile communication devices, etc.) unassociated with the government entity (e.g., non-government users). In some examples, a group of network users may have a particular sensitivity related to sharing resources and may wish to, for example, reduce or even minimize information disclosure, increase or even maximize information security and/or reduce or even prevent unintentional disclosure and/or discovery of information to unintended recipients. The example mobile network 100 of FIG. 1 is virtualized so that each network element includes a first virtualized slice 120 associated with the first group of UE 102, which is isolated via an example second virtualized slice 122 associated with the second group of UE 104. As used herein, a virtualized slice is an allocation of time for a logical partition in a virtualized computing environment. During a given allocation of time, a logical partition exclusively utilizes underlying hardware resources.

In operation, the example mobile network 100 of FIG. 1 virtualizes each of the network elements (e.g., the eNB 106, the MME 108, the serving gateway 110, the HSS 112, the PCRF node 114, the PDN gateway 116) to establish the first virtualized slice 120 and the second virtualized slice 122. In response to one or more UEs associated with the first group 102 requesting network service(s), such request(s) are routed exclusively through the corresponding first virtualized slice 120 of each network element within the mobile network 100. Similarly, in response to one or more UEs associated with the second group 104 requesting network service(s), such request(s) are routed exclusively through the corresponding second virtualized slice 122 of each network element within the mobile network 100. In the event one or more UEs associated with, for example, the first group 102 are compromised, the virtualization of each of the network elements prevents any of the UEs associated with the second group 104 from being affected.

However, while the UEs associated with the second group 104 may remain unaffected a the compromising act (e.g., DoS attack) associated with the first group 102 using the first virtualized slice 120, the totality of UEs in the attacked group are negatively affected by such an attack. The totality of the UEs in the attacked group are at a greater risk because, in part, they share a common point of failure (e.g., any of the slices 120, 122) with the totality of the attacked group. More specifically, UEs associated with a group may access a virtualized slice (e.g., slice 120 or slice 122) via an IP address and port number and/or a corresponding spectrum range. When the IP address/port number and/or spectrum range is compromised, it becomes a single point of failure for the whole group that is utilizing the corresponding virtualized slice (e.g., slice 120 or slice 122).

Methods, apparatus, systems and/or articles of manufacture disclosed herein improve security of a virtual private mobile network by, in part, reducing and/or minimizing the negative effects of one or more attacks to one or more members of a VPNM group (e.g., one or more UEs). In the illustrated example of FIG. 2, an example mobile network 200 includes network components substantially similar to those illustrated in FIG. 1. However, unlike the example mobile network 100 of FIG. 1 that facilitates two VPMNs (i.e., the first virtualized slice 120 and the second virtualized slice 122) to accommodate the first group of UEs 102 and the second group of UEs 104, respectively, the example mobile network 200 of FIG. 2 includes one or more virtualized slices. As described in further detail below, in the example of FIG. 2 each VPMN group (e.g., a government user group and a non-government user group) includes an associated plurality of virtualized slices associated therewith that accommodates UEs to serve its members. In other words, each VPMN group is divided into two or more subgroups within the same VPMN and each subgroup is assigned different slices of the network.

In operation, the plurality of UEs associated with the first VPMN group 202 are associated with one of the subgroups of the VPMN and, thus, with a corresponding subset of virtualized slices assigned to service the first VPMN group. Similarly, the plurality of UEs associated with the second VPMN group 204 are associated with one of the subgroups of the VPMN and, thus, with a corresponding subset of virtualized slices assigned to service the second VPMN group. As such, in the event one of the UEs is compromised, only the subgroup associated with that user, as opposed to the entire VPMN group, is affected by the compromise (e.g., a DoS attack). Assignment of UEs to subgroups may be done in any manner (e.g., randomly, pursuant to a formula, etc.).

Figure 2:
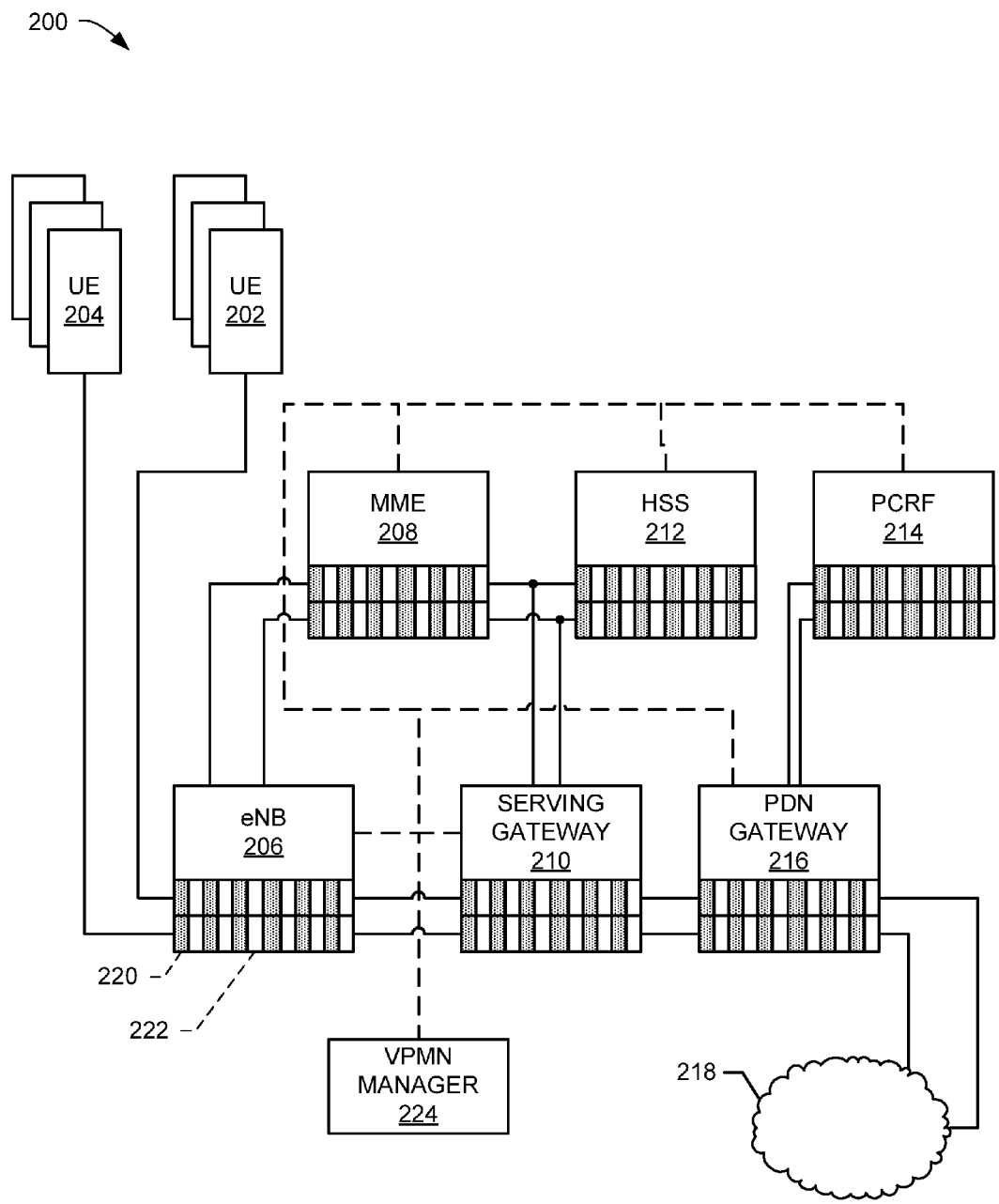
FIG. 2 is a schematic illustration of an example system that facilitates improved security of a virtual private mobile network.

The example mobile network 200 of FIG. 2 includes a VPMN manager 224 to configure each of the network elements to include any number of virtualized instances (slices) associated with a first group 220 and a second group 222. Although examples illustrated herein describe two VPMN groups to operate with the example mobile network 200, any number of VPMN groups may be realized by the methods, apparatus, systems and/or articles of manufacture disclosed herein.

To set up VPMNs, the example VPMN manager 224 of FIG. 2 receives a request and/or command to generate one or more virtualized groups to associate with UEs. As described above, a first virtualized group may be generated by the example VPMN manager 224 to accommodate government users and their corresponding UEs 202, and a second virtualized group may be generated by the example VPMN manager 224 to accommodate non-government users and their corresponding UEs 204.

Continuing with the above example, in which two groups are identified (i.e., a government group 202 and a non-government group 204), the example VPMN manager 224 of FIG. 2 applies a multiplication factor (e.g., 12) to the number of requested groups (e.g., 2) to generate a slice count (e.g., a number of virtualized instances associated with all desired VPMN groups). In response to a request and/or command to facilitate, for example, two separate groups of users within each VPMN group, the example VPMN manager 224 multiplies the subgroup integer value (i.e., 2) by the slice count (e.g., a multiplication factor) for example, twelve. The resulting total slice quantity in view of the aforementioned example is twenty-four (24). In some examples, the VPMN manager 224 associates equal portions of the resulting slices to each of the identified VPMN groups (e.g., twelve slices are associated with the government group, twelve slices are associated with the non-government group). In other examples, the VPMN manager 224 associates the resulting slices in a manner proportional to the size and/or demand (e.g., bandwidth) of each identified VPNM group.

In the illustrated example of FIG. 2, the VPMN manager 224 associated twelve slices 220 (see shaded rectangles) with the first VPMN group of UEs 202 and twelve slices 222 (see non-shaded rectangles) associated with the second group of UEs 204. In response to a request from a UE associated with a group, the example VPMN manager 224 assigns the UE to one of the virtualized slices based on a subgroup membership. In effect, even if one or more of the slices becomes compromised due to, for example, a DoS attack, because the whole group is not assigned to a single slice, only the subgroups associated with the comprimized subgroups will be adversely affected, not the VPMN group as a whole.

Figure 3:
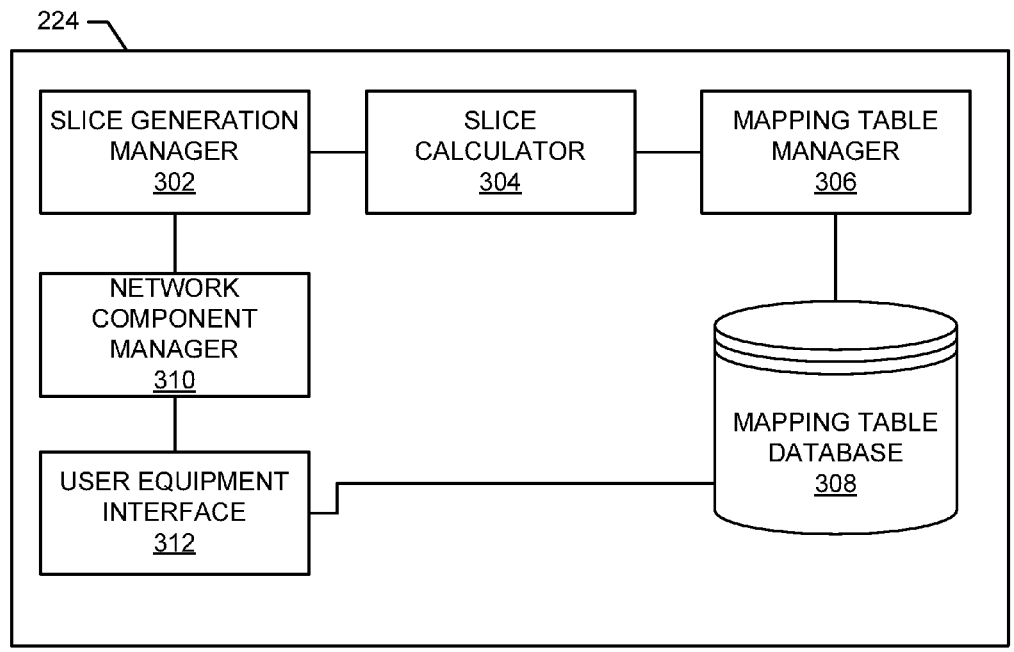
FIG. 3 illustrates an example implementation of the example virtual private mobile network manager to of FIG. 2.

FIG. 3 is a schematic illustration of an example implementation of the example VPMN manager 224 of FIG. 2. In the illustrated example of FIG. 3, the VPMN manager 224 includes a slice generation manager 302, a slice calculator 304, a mapping table manager 306, a mapping table database 308, a network component manager 310, and a user equipment interface 312. In operation, the slice generation manager 302 receives a request to establish one or more VPMN(s) for a mobile network environment, such as the mobile network environment 200 of FIG. 2. The example slice generation manager 302 receives and/or identifies a number of subgroups to operate with the mobile network environment 200 and invokes the slice calculator 304 to apply a multiplication factor to the requested number of VPMN groups. The result of this calculation is a number of virtualized slices to be initialized by the example network component manager 310.

The network component manager 310 of the illustrated example may be communicatively connected to some or all of the network elements of the example mobile network environment 200. Based on the resulting number of virtualized slices calculated by the slice calculator 304, the network component manager 310 instructs each network element utilized in the corresponding VPMN to generate the corresponding quantity of virtualized slices. For example, the network component manager 310 of FIG. 3 instructs each of the example eNB 206, the example MME 208, the example serving gateway 210, the example HSS 212, the example PCRF node 214 and the example PDN gateway 216 to generate twenty-four (24) virtualized slices because two VPMNs are being established and each VPMN is to include twelve subgroups.

The initialized virtualized slices are associated with a UE in response to that UE requesting to utilize the example mobile network environment 200. For example, request from an authorized UE by the example user equipment interface 312, which identifies the VPMN group, and searches the example mapping table database 308 to determine if the requesting UE has a subgroup assignment in a mapping table stored in the database 308. If not, then the example mapping table manager 306 assigns the requesting UE to one of the subgroups associated with the corresponding VPMN group and updates the mapping table stored in the mapping table database 308. Additionally, the network component manager 310 of the illustrated example propagates the assignment to each of the network elements in the example mobile network environment 200.

In some examples, the mapping table manager 306 assigns members of one VPMN group to all odd numbered virtual slices, and assigns members of another VPMN group to all even numbered virtual slices. In other examples, the mapping table manager 306 assigns a consecutive number of virtualized slices to each corresponding VPMN group.

In some examples, the mapping table manager 306 assigns each requesting UE to a subgroup (and corresponding virtualized slice) based on an indication of slice load to facilitate load balancing of the plurality of virtualized slices. In the event that the example network component manager 310 of FIG. 3 identifies one or more of the network element slices is at or near a capacity threshold (e.g., an HSS threshold limit of four UEs per slice), then the mapping table manager 306 may assign a next requesting UE to a next available virtualized slice.

Other examples of UE and/or group assignment may occur in a randomized manner. As described above, each virtualized slice may be associated with a corresponding IP address and port number. While a hacker may compromise one virtualized slice based on knowledge of the IP address and port number, the example mapping table manager 306 may randomly assign virtualized slices to the VPMN group so that attempts to seek consecutive IP addresses and/or port numbers near the compromised IP address and/or port number do not reach in a valid virtualized slice.

While an example manner of implementing the example mobile network 200 has been illustrated in FIGS. 2 and 3, one or more of the elements, processes and/or devices illustrated in FIGS. 2 and 3 may be combined, divided, re-arranged, omitted, eliminated and/or implemented in any other way. Further, the example VPMN manager 224, the example slice generation manager 302, the example slice calculator 304, the example mapping table manager 306, the example mapping table database 308, the example network component manager 310 and/or the example user equipment interface 312 of FIG. 3 may be implemented by hardware, software, firmware and/or any combination of hardware, software and/or firmware. Thus, for example, any of the example VPMN manager 224, the example slice generation manager 302, the example slice calculator 304, the example mapping table manager 306, the example mapping table database 308, the example network component manager 310 and/or the example user equipment interface 312 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus claims of the patent are read to cover a purely software and/or firmware implementation, at least one of the example VPMN manager 224, the example slice generation manager 302, the example slice calculator 304, the example mapping table manager 306, the example mapping table database 308, the example network component manager 310 and/or the example user equipment interface 312 of FIG. 3 are hereby expressly defined to include a tangible computer readable medium such as a memory, DVD, CD, etc. storing the software and/or firmware. Further still, the example system 200 of FIGS. 2 and 3 may include one or more elements, processes and/or devices in addition to, or instead of, those illustrated in FIGS. 2 and 3, and/or may include more than one of any or all of the illustrated elements, processes and devices.

Figure 4A:
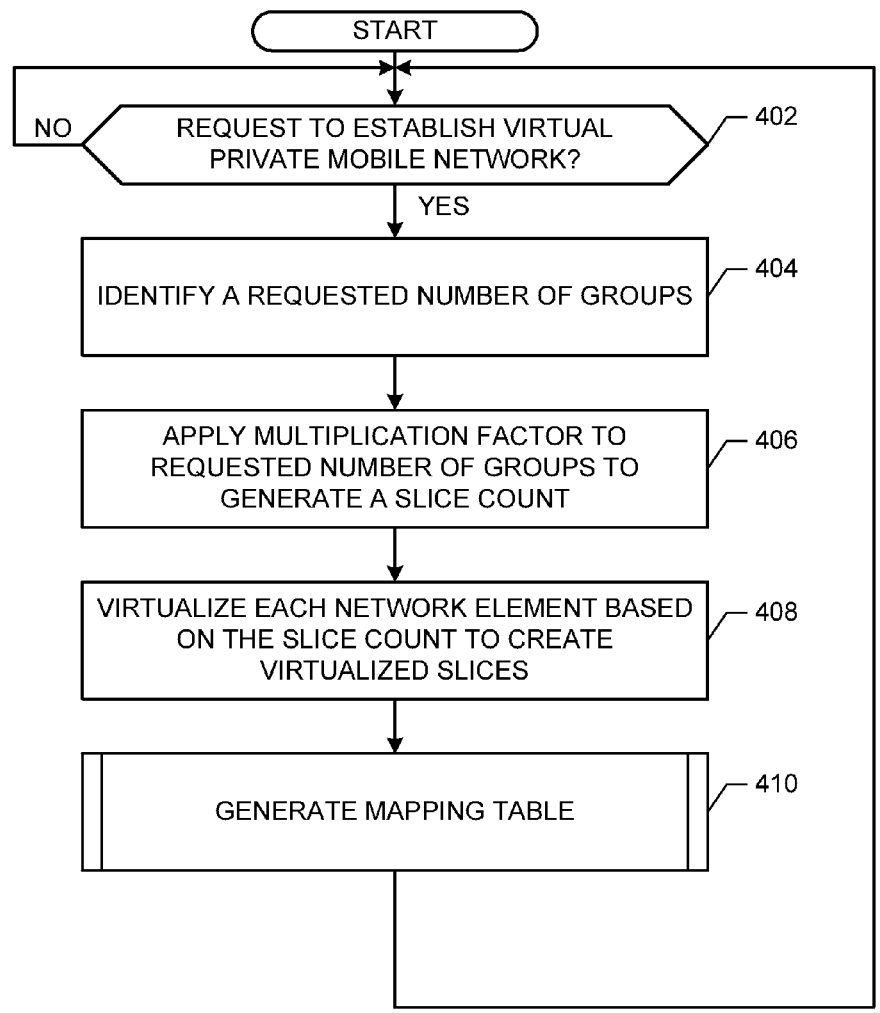
FIGS. 4A, 4B and 5 are flowcharts representative of example machine readable instructions that may be executed to implement the example system shown in FIGS. 2 and/or 3.
Figure 4B:
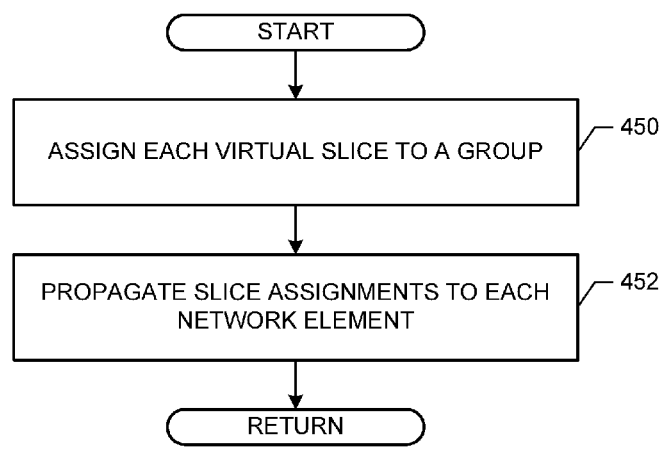
Figure 5:
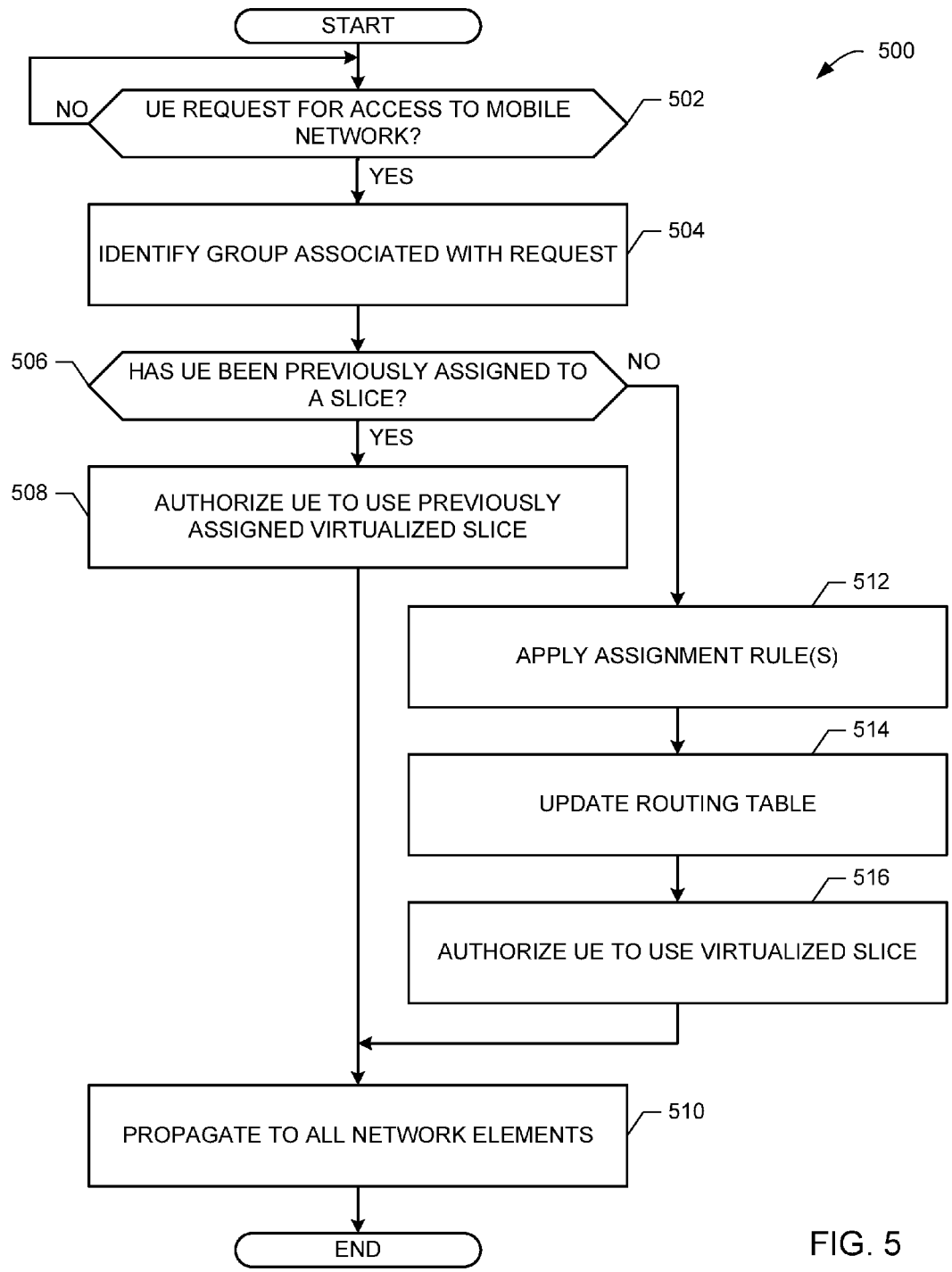

Flowcharts representative of example machine readable instructions for implementing the system 200 of FIG. 2 and/or the example VPMN manager 224 of FIG. 3 are shown in FIGS. 4A, 4B and 5. In these examples, the machine readable instructions comprise a program for execution by a processor such as the processor P105 shown in the example computer P100 discussed below in connection with FIG. 6. The program may be embodied in software stored on a tangible computer readable medium such as a CD-ROM, a floppy disk, a hard drive, a digital versatile disk (DVD), or a memory associated with the processor P105, but the entire program and/or parts thereof could alternatively be executed by a device other than the processor P105 and/or embodied in firmware or dedicated hardware. Further, although the example program is described with reference to the flowcharts illustrated in FIGS. 4A, 4B and 5, many other methods of implementing the example system 200 and/or the example VPMN manager 224 may alternatively be used. For example, the order of execution of the blocks may be changed, and/or some of the blocks described may be changed, eliminated, or combined.

As mentioned above, the example processes of FIGS. 4A, 4B and 5 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4A, 4B and 5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

The program 400 of FIG. 4A begins at block 402 where the example slice generator manager 302 monitors the example mobile network 200 for one or more requests to establish a virtual private mobile network. If no requests are received, the example slice generator manager 302 continues to monitor the network 200. Otherwise, it identifies a requested number of VPMN groups (i.e., a number of VPMNs to be established) (block 404). In response to identifying the requested number of VPMN groups (block 404), the example slice calculator 304 applies a multiplication factor corresponding to a desired number of subgroups to the requested number of groups to generate a slice count (block 406). For network elements (sometimes referred to herein as "network components") operating in the example mobile network 200 that are to handle VPMN traffic, the example network component manager 310 virtualizes the network element based on the slice count to create virtualized slices (block 408). In some examples, if a request is received by the slice generation manager 302 to facilitate services for two separate VPMN groups (e.g., a government user group and a non-government user group), then the slice calculator applies the multiplication factor to the value of two. If the multiplication factor is twelve (e.g., twelve subgroups are to be established for two VPMN groups), then the resulting number of virtualized slices generated at each network component by the network component manager 310 is twenty-four. After the network components are initialized to operate with the calculated number of virtualized slices, the example mapping table manager 306 generates a mapping table to associate each slice with one of the desired VPMN groups and/or subgroups (block 410).

The program 410 of FIG. 4B begins at block 450 where the example mapping table manager 306 designates and/or otherwise assigns each virtualized slice to one of the two example VPMN groups (e.g., the government user group or the non-government user group). Continuing with the aforementioned example of two groups and a multiplication factor of twelve, the example mapping table manager 306 may associate the first twelve virtualized slices with the first group of government users, and may associate the second twelve virtualized slices with the second group of non-government users. In other examples, the mapping table manager 306 may associate each of the twenty-four virtualized slices in a random manner to the government group of users and non-government group of users. In still other examples, the mapping table manager 306 may allocate the twenty-four virtualized slices so that odd numbered slices (i.e., 1, 3, 5, 7, 9, 11, 13, 15, 17, 19, 21 and 23) are assigned to the government group of users, and the even numbered slices (i.e., 2, 4, 6, 8, 10, 12, 14, 16, 18, 20, 22 and 24) are assigned to the non-government group of users. In some examples, the mapping table manager 306 may associate each of the twenty-four virtualized slices based on an indication of group demand. For example, if the VPMN group associated with government users is relatively small when compared to the VPMN group associated with non-government users, the mapping table manager 306 may associate a proportionate number of virtualized slices to each VPMN group (e.g., a greater number of virtualized slices may be associated with non-government users as compared with government users). The indication of VPMN group demand may be based on, for example, a number of expected users in the VPMN group, a number of expected UEs of the group to utilize the mobile network, an expected network demand from the group (e.g., a bandwidth demand), etc.

An example mapping table is shown below as Table 1, in which the example mapping table manager 306 assigned the twenty-four virtualized slices (i.e., subgroups) to either the VPMN group of government users or the group of non-government users in a random manner.

TABLE 1

| Virtualized Slice Number (subgroups) | VPMN Group Assignment | UE |
|---|---|---|
| 1 | Government User | A, G, Q, F |
| 2 | Government User | T, N, B |
| 3 | Non-Government | |
| 4 | Government User | |
| 5 | Non-Government | Z, S, L |
| 6 | Non-Government | |
| 7 | Government User | |
| 8 | Non-Government | |
| 9 | Non-Government | |
| 10 | Government User | |
| 11 | Government User | |
| 12 | Government User | |
| 13 | Government User | |
| 14 | Government User | |
| 15 | Government User | |
| 16 | Non-Government | |
| 17 | Government User | |
| 18 | Non-Government | |
| 19 | Non-Government | |
| 20 | Government User | |
| 21 | Non-Government | |
| 22 | Non-Government | |
| 23 | Non-Government | |
| 24 | Non-Government | |

In the illustrated example of Table 1, the mapping table generator has assigned slices 1, 2, 4, 7, 10-15, 17 and 20 to the government VPMN user group in a random manner. The mapping table is stored to the example mapping table database 308 to facilitate later retrieval when configuring the example mobile network 200. For example, after the mapping table is generated by the example mapping table manager 306, the example network component manager 310 updates the network elements with the corresponding information for the virtualized slices based on the mapping table (block 452). As such, each of the network elements employs the same mapping table configuration during operation.

The program 500 of FIG. 5 begins at block 502 where the example user equipment interface 312 monitors and/or otherwise identifies a request for access to the mobile network 200. In response to receiving, identifying and/or otherwise detecting a request from a UE (block 502), the example user equipment interface 312 identifies a VPMN group associated with the request for services from the wireless network 200 (block 504). The example user equipment interface 312 queries the example mapping table database 308 to determine whether the requesting UE has been previously assigned to a virtualized slice (i.e., to a subgroup) (block 506). If so, then the example user equipment interface 312 authorizes the UE to use the previously assigned virtualized slice.

For example, returning to the example Table 1, a UE column identifies whether a corresponding virtualized slice has a corresponding UE assigned to it. In the illustrated example of Table 1, UEs identified as "A," "G," "Q," and "F" are authorized to operate with virtualized slice number 1. Additionally, UEs identified as "T," "N," and "B" are authorized to operate with virtualized slice number 2, and UEs identified as "Z," "S," and "L" are authorized to operate with virtualized slice number 5. While the illustrated example of Table 1 identifies each UE with letters, such nomenclature is arbitrary and has been shown for purposes of illustration and not limitation. For example, each of the UEs identified in the UE column may include an international mobile equipment identity (IMEI) number, an electronic serial number (ESN), and/or any other identifier to identify the UE in a unique manner. In response to identifying a UE match in the mapping table (block 506), the example user equipment interface 312 authorizes the UE to use the corresponding VPMN of the mobile network 200 via the previously assigned virtualized slice (block 508). Such authorization may be propagated, by the example network component manager 310, to all the network elements of the mobile network 200 that have virtualized slices for the corresponding subgroup (block 510).

In the event that the user equipment interface 312 learns, after querying the example mapping table database 308, that the requesting UE has not been previously assigned to a virtualized slice (block 506), then the mapping table manager 306 applies one or more assignment rule(s) to assign the UE to a subgroup (block 512). For example, if the UE having an identifier "V" is absent from the example Table 1 above, then the UE has not been previously assigned to any virtualized slice in the example mobile network 200 (block 506). Assuming that the UE associated with the identifier "V" is associated with the VPMN group of government users, then the example mapping table manager 306 applies one or more assignment rules to determine which virtualized slice/subgroup to associate with UE "V" (block 512). In some examples, the assignment rule(s) may address load balancing concerns by distributing virtualized slices in a manner that reduces, avoids and/or minimizes the load(s) of already burdened slices based on load balancing information (e.g., threshold limits of a number of UEs per slice that allow acceptable performance of the network element). In the example of Table 1, virtualized slice 1, which is associated with government users, already supports four separate UEs (i.e., "A," "G," "Q," and "F"). To prevent virtualized slice 1 from becoming inundated with too many UEs (e.g., as determined by performance metrics for virtualization performance), the mapping table manager 306 may assign UE "V" to a virtualized slice/subgroup that does not already have any assignment and/or that is less burdened than slice 1. For example, the mapping table manager 306 may select virtualized slice 4 because it does not have any assigned UEs. In other examples, the mapping table manager 306 may associate UEs to virtualized slices in a random manner (e.g., via a random number generator) and/or any other approach, which may or may not be influenced by load balancing information.

To associate the UE with a virtualized slice, the mapping table manager 306 updates the mapping table to reflect the association and stores the table to the mapping table database 308 (block 514). The example user equipment interface 312 authorizes the UE to utilize the assigned virtualized slice (block 516) and the updated mapping table is propagated to all of the network elements in the mobile network 200 by the example network component manager 310 (block 510).

Figure 6:
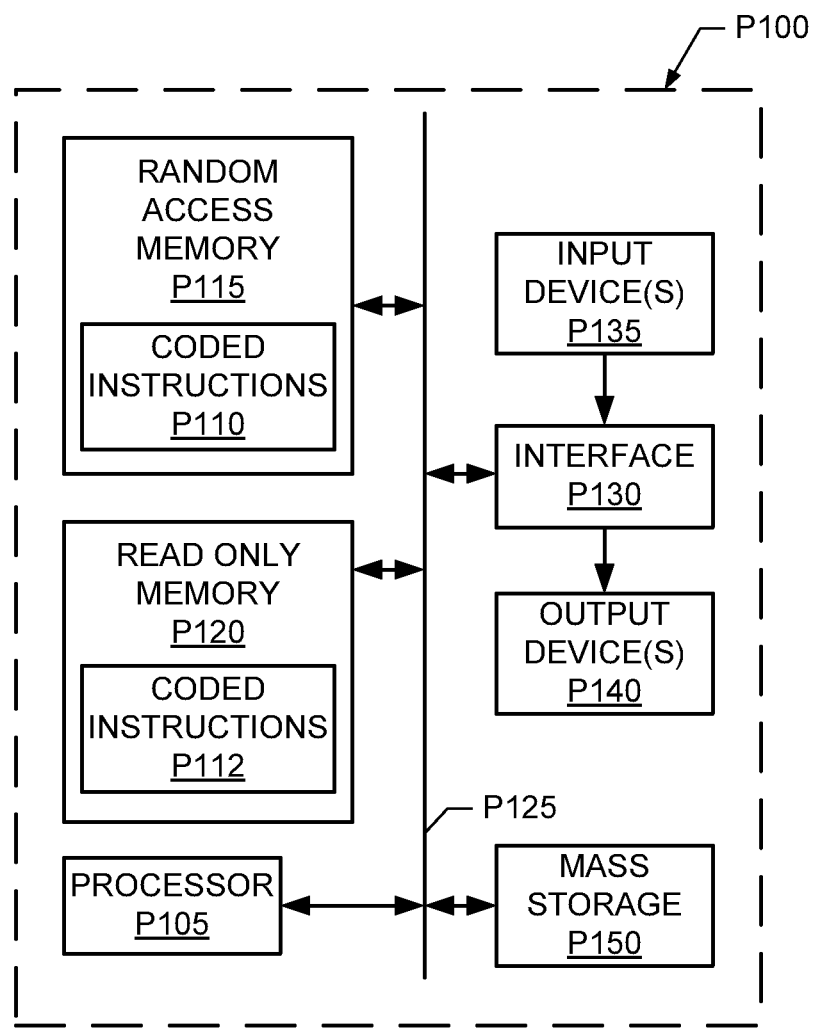
FIG. 6 illustrates an example processor platform that may execute the instructions of FIGS. 4A, 4B and/or 5 to implement any or all of the example methods, systems, and/or apparatus disclosed herein.

FIG. 6 is a block diagram of an example processing platform P100 capable of executing the instructions of FIGS. 4A, 4B and 5 to implement the mobile environment 200 of FIG. 2 and/or the example apparatus of FIG. 3. The processor platform P100 can be, for example, a server, a personal computer, or any other type of computing device.

The processor platform P100 of the instant example includes a processor P105. For example, the processor P105 can be implemented by one or more Intel® microprocessors. Of course, other processors from other families are also appropriate.

The processor P105 is in communication with a main memory including a volatile memory P115 and a non-volatile memory P120 via a bus P125. The volatile memory P115 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory P120 may be implemented by flash memory and/or any other desired type of memory device. Access to the main memory P115, P120 is typically controlled by a memory controller.

The processor platform P100 also includes an interface circuit P130. The interface circuit P130 may be implemented by any type of past, present or future interface standard, such as an Ethernet interface, a universal serial bus (USB), and/or a PCI express interface.

One or more input devices P135 are connected to the interface circuit P130. The input device(s) P135 permit a user to enter data and commands into the processor P105. The input device(s) can be implemented by, for example, a keyboard, a mouse, a touchscreen, a track-pad, a trackball, isopoint and/or a voice recognition system.

One or more output devices P140 are also connected to the interface circuit P130. The output devices P140 can be implemented, for example, by display devices (e.g., a liquid crystal display, and/or a cathode ray tube display (CRT)). The interface circuit P130, thus, typically includes a graphics driver card.

The interface circuit P130 also includes a communication device, such as a modem or network interface card to facilitate exchange of data with external computers via a network (e.g., an Ethernet connection, a digital subscriber line (DSL), a telephone line, coaxial cable, a cellular telephone system, etc.).

The processor platform P100 also includes one or more mass storage devices P150 for storing software and data.

Examples of such mass storage devices P150 include floppy disk drives, hard drive disks, compact disk drives and digital versatile disk (DVD) drives.

The coded instructions of FIGS. 4A, 4B and 5 may be stored in the mass storage device P150, in the volatile memory P110, in the non-volatile memory P112, and/or on a removable storage medium such as a CD or DVD.

From the foregoing, it will be appreciated that disclosed methods, apparatus, systems and/or articles of manufacture allow a mobile network to operate with improved security by, isolating the negative effects of a security breach within a VPMN to a subset of a group of mobile users sharing the VPMN. While a hacker may compromise one or more virtualized slices of the example mobile network 200, the entire group will not be negatively affected by such hacking activities in view of the subgroup isolation provided within the VPMN by example methods, apparatus, systems and/or articles of manufacture disclosed herein.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to prevent consecutive attacks on a virtual private mobile network, the method comprising:
   for each of a plurality of network elements:
      generating, with a hardware processor, virtualized slices based on a virtualized slice count value for subgroups associated with the virtual private mobile network, the virtualized slice count based on a multiplication factor associated with a number of subgroups defined within the virtual private mobile network, wherein the number of subgroups is at least two;
      determining a demand for the virtualized slices by at least one of a number of expected users of one or more of the subgroups, a number of expected mobile devices that will use one or more of the subgroups, or an expected bandwidth to be used by one or more of the subgroups;
      preventing consecutive attacks on the virtualized slices of the virtual private mobile network by assigning non-consecutive ones of the virtualized slices to the subgroups associated with the virtual private mobile network based on the demand for the virtualized slices by the respective ones of the subgroups; and
   in response to a request from a mobile device to access the virtual private mobile network for a first time, assigning the mobile device to one of the virtual slices of the plurality of network elements based on (i) the subgroup associated with the mobile device, and (ii) availability of the virtual slices.

2. The method as defined in claim 1, further including determining the availability of the virtual slices based on load balancing information.

3. The method as defined in claim 1, further including determining the availability of the virtual slices based on a threshold number of mobile devices.

4. The method as defined in claim 1, wherein the assigning of the mobile device to the one of the virtual slices further includes assigning the mobile device to one of the available virtual slices based on an output of a random number generator.

5. The method as defined in claim 1, wherein the non-consecutive ones of the virtualized slices are alternating.

6. An apparatus to prevent consecutive attacks on a virtual private mobile network, the apparatus comprising:
   a processor; and
   a memory including instructions that, when executed, cause the processor to:
   for each of a plurality of network elements:
      generate virtualized slices based on a virtualized slice count value for subgroups associated with the virtual private mobile network, the virtualized slice count based on a multiplication factor associated with a number of subgroups defined within the virtual private mobile network, wherein the number of subgroups is at least two;
      determine a demand for the virtualized slices by at least one of a number of expected users of one or more of the subgroups, a number of expected mobile devices that will use one or more of the subgroups, or an expected bandwidth to be used by one or more of the subgroups;
      prevent consecutive attacks on the virtualized slices of the virtual private mobile network by assigning non-consecutive ones of the virtualized slices to the subgroups associated with the virtual private mobile network based on the demand for the virtualized slices by the respective ones of the subgroups; and
   in response to a request from a mobile device to access the virtual private mobile network for a first time, assigning the mobile device to one of the virtual slices of the plurality of network elements based on (i) the subgroup associated with the mobile device, and (ii) availability of the virtual slices.

7. The apparatus as defined in claim 6, further including instructions that, when executed, cause the processor to determine the availability of the virtual slices based on load balancing information.

8. The apparatus as defined in claim 6, further including instructions that, when executed, cause the processor to determine the availability of the virtual slices based on a threshold number of mobile devices.

9. The apparatus as defined in claim 6, wherein to assign the mobile device to the one of the virtual slices, the instructions cause the processor to assign the mobile device to one of the available virtual slices based on an output of a random number generator.

10. The apparatus method as defined in claim 6, wherein the non-consecutive ones of the virtualized are alternating.

11. A machine accessible storage device comprising instructions that, when executed, cause a machine to, at least:
   for each of a plurality of network elements:
      generate virtualized slices based on a virtualized slice count value for subgroups associated with the virtual private mobile network, the virtualized slice count based on a multiplication factor associated with a number of subgroups defined within the virtual private mobile network, wherein the number of subgroups is at least two;
      determine a demand for the virtualized slices by at least one of a number of expected users of one or more of the subgroups, a number of expected mobile devices that will use one or more of the subgroups, or an expected bandwidth to be used by one or more of the subgroups;
      prevent consecutive attacks on the virtualized slices of the virtual private mobile network by assigning non-consecutive ones of the virtualized slices to the subgroups associated with the virtual private mobile network based on the demand for the virtualized slices by the respective ones of the subgroups; and in response to a request from a mobile device to access the virtual private mobile network for a first time, assign the mobile device to one of the virtual slices of the plurality of network elements based on (i) the subgroup associated with the mobile device, and (ii) availability of the virtual slices.

12. The machine accessible storage device as defined in claim 11, further including instructions that, when executed, cause the machine to determine the availability of the virtual slices based on load balancing information.

13. The machine accessible storage device as defined in claim 11, further including instructions that, when executed, cause the machine to determine the availability of the virtual slices based on a threshold number of mobile devices.

14. The machine accessible storage device as defined in claim 11, wherein to assign the mobile device to the one of the virtual slices of each of the plurality of network elements, the instructions cause the machine to assign the mobile device to one of the available virtual slices based on an output of a random number generator.

15. The machine accessible storage device as defined in claim 11, wherein the non-consecutive ones of the virtualized slices are alternating.

* * * * *